(12) United States Patent  (10) Patent No.: US 7,073,315 B2
Nixon  (45) Date of Patent: Jul. 11, 2006

(54) APPARATUS FOR AND METHOD OF HARVESTING COTTON

(75) Inventor: Michael Andrew Nixon, P.O. Box 36, Merriwa, New South Wales, 2329 (AU)

(73) Assignees: Michael Andrew Nixon, New South Wales (AU); Carol Ann Nixon, New South Wales (AU)

( * ) Notice: Subject to any disclaimer, the term of this patent is extended or adjusted under 35 U.S.C. 154(b) by 0 days.

(21) Appl. No.: 10/871,660

(22) Filed: Jun. 18, 2004

(65) Prior Publication Data

US 2005/0011175 A1    Jan. 20, 2005

(30) Foreign Application Priority Data

Jul. 18, 2003  (AU) ............... 2003903704

(51) Int. Cl.
   *A01D 46/08*  (2006.01)
(52) U.S. Cl. ................... 56/28; 56/33; 56/36
(58) Field of Classification Search .......... 56/28, 56/33, 34, 36, 40, 50
   See application file for complete search history.

(56) References Cited

U.S. PATENT DOCUMENTS

| | | | | |
|---|---|---|---|---|
| 3,651,624 | A * | 3/1972 | Bandemer ................. | 56/28 |
| 3,685,263 | A * | 8/1972 | Kappelman et al. ........ | 56/1 |
| 3,757,502 | A * | 9/1973 | Hubbard .................. | 56/28 |
| 3,927,511 | A * | 12/1975 | Burris et al. ............ | 56/33 |
| 4,461,139 | A * | 7/1984 | Hernandez ................ | 56/14.5 |
| 4,470,245 | A * | 9/1984 | Agadi .................... | 56/28 |
| 4,606,177 | A * | 8/1986 | Schlueter ................ | 56/30 |
| 4,691,505 | A * | 9/1987 | Browne ................... | 56/503 |
| 4,922,695 | A * | 5/1990 | Covington et al. ......... | 56/40 |
| 5,077,964 | A * | 1/1992 | Kabat .................... | 56/327.1 |
| 6,293,078 | B1 * | 9/2001 | Deutsch et al. ........... | 56/44 |
| 6,550,230 | B1 * | 4/2003 | Fox ...................... | 56/44 |

\* cited by examiner

*Primary Examiner*—Meredith Petravick
(74) *Attorney, Agent, or Firm*—Mayer & Williams PC; Mark D. Wieczorek, Esq.

(57) ABSTRACT

A method and apparatus for harvesting cotton, arranged for forward motion through a cotton crop comprising cotton plants having cotton bolls. The apparatus includes a mounting assembly, gathering rollers mounted to the mounting assembly for gathering the cotton plants into a processing disposition, a cutter assembly for cutting stems from the cotton plants to produce cut cotton plant material, a pair of toothed rollers providing a pinch therebetween, the spacing between the toothed rollers being selectable to permit passage of the cut cotton plant material through the pinch, one or more beater rollers to permit further passage of the cut cotton plant material through the pinch between the toothed rollers; one or more cotton fibre removal rollers for removing the cotton fibre from the toothed rollers, a drive transmission, and a drive operatively associated with the drive transmission for driving the drive transmission and thereby the rotatable parts about their respective axes or for moving the moveable parts. The method includes steps of gathering an upper portion of the cotton plants into cotton harvesting apparatus; cutting the upper portion from the cotton plants from the remainder to provide cut cotton plant material; substantially removing cotton fibre from the cut cotton plant material to provide cotton plant discard; discharging the cotton fibre from the cotton harvesting apparatus; and discharging the cotton plant discard from the cotton harvesting apparatus.

11 Claims, 2 Drawing Sheets

APPARATUS FOR AND METHOD OF HARVESTING COTTON

FIELD OF INVENTION

THIS INVENTION relates to apparatus for and a method of harvesting cotton. The invention is primarily directed to the harvesting of "ultra narrow row" cotton, and secondarily directed to the harvesting of cotton crops planted in the traditional manner. It will be appreciated that the invention is not necessarily limited to this field of use.

BACKGROUND ART

Cotton harvesting usually involves the use of a cotton picker which removes the cotton bolls from the plant and collects them in a bin or hopper. The pickers are made up of toothed drums which rotate such that the teeth tear the buds of cotton away from the plant. A pneumatic conveyor system then blows the picked cotton into the hopper. Further processing of the cotton bolls involves separation of the cotton fibre from the trash, and is usually carried out in a cotton gin or factory.

For some time now, a type of cotton farming known as "narrow row" or "ultra-narrow row" (UNR) farming has been introduced to increase the crop yield. Traditional cotton picker machines are not suited to this type of farming practice. Although cotton harvesters have been proposed for such crops, because they are based on a comb and rotating beater to strip the plants of cotton bolls, small branches and other trash are often included which can create problems when the cotton is ginned.

Known cotton pickers are not always efficient in removing cotton fibre cleanly from the husk, and sometimes cause high levels of trash to be included in the cotton fibre. Dirty cotton is difficult and costly to process, adversely affecting the carding and doffing processes, and may even damage cotton processing equipment. Moreover, the traditional cotton picker usually has a somewhat complex mechanical arrangements for changing the pitch of the barbs of the spiked or toothed spindles. Such arrangements are expensive to manufacture and maintain, and can be prone to failure.

The present invention aims to provide apparatus for and a method of harvesting cotton which ameliorates one or more of the shortcomings of the prior art, or at least to provide an alternative cotton harvesting apparatus. Other aims and advantages of the invention may become apparent from the following description.

DISCLOSURE OF THE INVENTION

With the foregoing in view, this invention resides broadly in cotton harvesting apparatus arranged for forward motion through a cotton crop comprising cotton plants having cotton bolls, said cotton harvesting apparatus including:

a mounting assembly having a plurality of mounting locations arranged in spaced relationship to one another;

one or more gathering rollers mounted to said mounting assembly for rotation about a guide roll axis or axes at one or more of said mounting locations (gathering roller mounting locations), for gathering one or more of the cotton plants into a processing disposition between said gathering roller mounting locations;

a cutter assembly mounted to and extending laterally between respective ones of said mounting locations (cutter mounting locations) for cutting stems from the one or more cotton plants to produce cut cotton plant material, the relative disposition of said cutter assembly being behind said gathering roller or rollers at a spacing selected to permit cut cotton plant material gathered into the processing disposition to be cut from the remainder of the cotton plants;

a pair of toothed rollers mounted to and extending between respective ones of said mounting locations (toothed roller mounting locations), each said toothed roller being disposed in spaced parallel relationship to the other for contra-rotation about substantially parallel toothed roller axes to provide a pinch therebetween, the spacing between the toothed rollers being selectable to permit passage of the cut cotton plant material through said pinch, said toothed rollers having a plurality of barbs arranged for removing at least some of the cotton fibre from the cotton bolls of the cut cotton plant material;

one or more beater rollers mounted to and extending between respective ones of said mounting locations (beater roller mounting locations) for co-rotation with, and in operative disposition with respect to, each toothed roller, the relative locations of the beater roller or rollers being selectable to permit further passage of the cut cotton plant material through said pinch between said toothed rollers;

one or more cotton fibre removal rollers mounted to and extending between respective ones of said mounting locations (removal roller mounting locations) and operatively associated with said toothed rollers for removing the cotton fibre from the toothed rollers;

a drive transmission operatively interconnecting the rotatable and/or moving parts for rotation or movement in their respective relative directions; and a drive operatively associated with the drive transmission for driving drive transmission and thereby the rotatable parts about their respective axes and/or for moving the moveable parts.

In another aspect, the present invention resides broadly in cotton harvesting apparatus arranged for forward motion through a cotton crop comprising cotton plants having cotton bolls, said cotton harvesting apparatus including:

mounting means having a plurality of mounting locations arranged in spaced relationship to one another;

gathering means mounted to one or more of the mounting locations (gathering means mounting locations) for gathering one or more of the cotton plants into a processing disposition between the gathering means mounting locations;

elongate cutting means mounted to and extending laterally between respective ones of the mounting locations (cutter mounting locations) for cutting the stems of the one or more cotton plants to produce cut cotton plant material, the relative disposition of the cutting means being behind the gathering means at a spacing selected to permit the cut cotton plant material gathered into the processing disposition to be cut from the remainder of the cotton plants;

a pair of toothed rollers mounted to and extending between respective ones of the mounting locations (toothed roller mounting locations), each roller being disposed in spaced parallel relationship to the other for contra-rotation about substantially parallel toothed roller axes, the spacing between the toothed rollers being selectable to permit passage of the cut cotton plant material therebetween, the toothed rollers having a plurality of teeth or barbs arranged for removing at least some of the cotton fibre from the cotton bolls of the cut cotton plant material;

one or more beater rollers mounted to and extending between respective ones of the mounting locations (beater roller mounting locations) for co-rotation with, and in operative disposition with respect to, each toothed roller, the relative locations of the beater roller or rollers being selectable to permit further passage of the cut cotton plant material through the pinch between the toothed rollers;

cotton fibre removal means mounted to and extending between respective ones of the mounting locations (removal means mounting locations) and operatively associated with the toothed rollers for removing the cotton fibre from the toothed rollers;

drive transmission means operatively interconnecting the rotatable and/or moving parts for rotation or movement in their respective relative directions; and drive means operatively associated with the drive transmission means for driving the rotatable parts about their respective axes and/or for moving the moveable parts.

In one form, the rollers are mounted laterally. In such form, it is preferred that the gathering means be formed as a plant gathering roller mounted to and extending laterally between respective mounting locations (roller mounting locations) for rotation about a gathering roller axis for gathering one or more of the cotton plants into a processing disposition between the mounting locations. The gathering roller is preferably in the form of a toothed roller having associated with it a beater roller and cotton fibre removing means of similar form and arrangement to that of the pair of toothed rollers hereinbefore described. Preferably, the teeth are in the form of fixed teeth or barbs arranged in spaced relationship about the outer circumference of a roller core or drum.

In another form, the rollers are mounted uprightly. In such form, the gathering means is preferably in the form of opposed resilient guiding wires biassed towards a relaxed position in which the wires cross in substantially central alignment with the pinch between the toothed rollers. The guiding wires are preferably arranged such that, in use, they engage with the lower part and/or lower branches of a cotton plant to urge the upper portion of the plant to be guided between the toothed rollers. Although one pair of wires is shown, it will be appreciated that further pairs of guiding wires may be provided in vertically or obliquely spaced relationship to those hereinbefore described.

Preferably, the cotton fibre removal means includes brushing means mounted to and extending between respective mounting locations (brush mounting locations) for contra-rotation with, and in operative disposition with respect to, each toothed roller, the operative disposition of the brushing means with respect to the toothed rollers being selectable or selected for substantial removal of the cotton fibre from the toothed rollers. More preferably, an air knife is operatively associated with one or each brushing means to assist in the substantial removal of the cotton fibre from the toothed rollers. In the case of the laterally mounted rollers, it is also preferred that the toothed rollers, beater rollers, brushing means and air knives constitute a first set of rollers, and there is further provided a second set of toothed rollers, beater rollers, brushing means and air knives in operative disposition behind the first set to receive the plant material for further removal of cotton fibre therefrom. In the case of the uprightly mounted rollers, it is further preferred that a third set of toothed rollers, beater rollers, brushing means and air knives be provided.

Cotton fibre ducting means is also preferably provided in operative disposition with respect to the cotton fibre removing means. Plant shredding means is preferably provided mounted to respective mounting locations (shredder mounting locations) in operative disposition with respect to the beater rollers for receiving cut cotton plant material from which cotton fibre has been substantially removed and shredding the material for discharge from the apparatus.

The brushing means are preferably formed as rotatable brush rollers, preferably one brush roller being provided for each toothed roller. In such form, it is preferred that a plurality of rows of bristles be provided in circumferentially spaced relationship about the outer face of a roller drum or bar mounted for rotation to the brush roller mounting locations. Preferably, the rows extend spirally. The twist or the spiral arrangement may be reversed one or more times along the length of the brush roller. It is further preferred that the drive transmission means is arranged such that, in operation, the circumferential speed of the rotatable elements increases along the pathway through which the cotton plant material is intended to pass.

In another aspect, the present invention resides in a method of harvesting cotton including:

gathering an upper portion of one or more cotton plants into cotton harvesting apparatus;

cutting the upper portion or portions from the cotton plant or plants from the remainder of the cotton plant or plants to provide cut cotton plant material;

substantially removing cotton fibre from the cut cotton plant material to provide cotton plant discard;

discharging the cotton fibre from the cotton harvesting apparatus; and discharging the cotton plant discard from the cotton harvesting apparatus.

Preferably, the cotton plant discard is shredded or mulched prior to discharge from the cotton harvesting apparatus. Preferably, the cotton harvesting apparatus as herein described is used to harvest the cotton according to the invention. In such form, it is preferred that the method includes gathering an upper portion or portions of one or more cotton plants by a rotating gathering roller into a processing disposition;

cutting the upper portion or portions by elongate cutting means mounted below, behind and substantially parallel to the plant gathering roller to provide cut cotton plant material;

passing the cut cotton plant material between a pair of toothed rollers having a plurality of teeth disposed about their circumferential periphery;

removing at least some of the cotton fibre from the cut cotton plant material by operative interaction of the teeth with the cotton bolls of the cut cotton plant material;

further passing the cut cotton plant material (less the removed cotton fibre) through upper and lower beater rollers mounted co-rotating with, and in operative disposition with respect to, the toothed rollers respectively; and removing the cotton fibre from the toothed rollers using cotton fibre removing means in operative disposition with respect to the toothed rollers.

In another aspect, the present invention resides broadly in a method of harvesting cotton using cotton harvesting apparatus as hereinbefore described, including:

moving the apparatus in operative juxtaposition with respect to a plurality of cotton plants whilst rotating the rollers therein;

gathering an upper portion or portions of one or more of the cotton plants into a processing disposition by the gathering roller;

cutting the upper portion or portions from the remainder of the cotton plant by the elongate cutters to provide cut cotton plant material;

removing at least some of the cotton fibre from the cut cotton plant material by passing the cut cotton plant material between a pair of toothed rollers;

removing at least some more of the cotton fibre from the cut cotton plant material by passing the cut cotton plant material through upper and lower beater rollers mounted co-rotating with, and in operative disposition with respect to, the toothed rollers respectively; and removing the cotton fibre from the toothed rollers using cotton fibre removing rollers rotating in operative spaced relationship with respect to the toothed rollers.

BRIEF DESCRIPTION OF THE DRAWINGS

In order that the invention may be more readily understood and put into practical effect, reference will now be made to the accompanying drawings which illustrate a preferred embodiment of the invention and wherein.

DETAILED DESCRIPTION OF THE DRAWINGS

Figure 1:
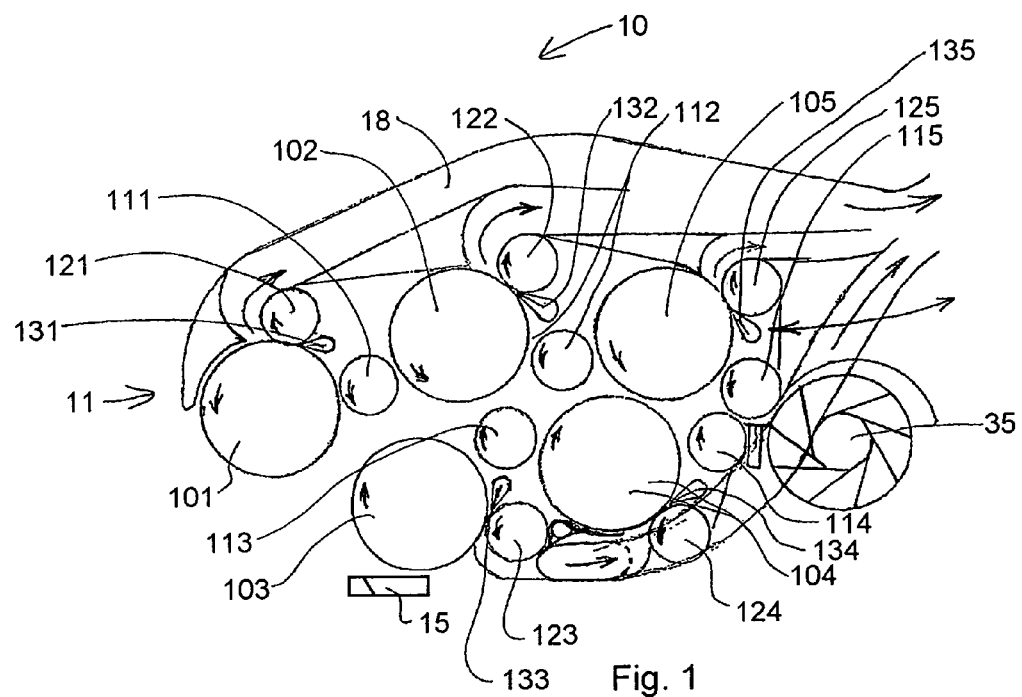
FIG. 1 is a diagrammatic side elevation sectional view of a first form of cotton harvesting apparatus according to the invention.

The first form of cotton harvesting apparatus 10 shown in FIG. 1 has five toothed rollers, with reference numerals 101, 102, 103, 104, and 105 respectively starting from the front end of the apparatus at 11. It can be seen that the forward most toothed roller performs as a gathering roller and from there, pairs of toothed rollers at 102 and 103 as a first pair and at 103 and 104 as a second pair are mounted behind the gathering roller 101. A cutter assembly 15 is mounted beneath the lower one of the first pair of toothed rollers 103 and behind the position of the gathering roller 101. The cutter assembly is in the form of a pair of oscillating knives, preferably having blades which engage one another, for cutting the stem of the cotton plant.

Mounted in close proximity to each toothed roller is a smooth roller or beater, each one being shown by reference numerals 111, 112, 113, 114 and 115 in order from the front end to the rear end of the apparatus. Each beater corresponds to a toothed roller having the same final digit in respect of its reference numeral. In similar fashion, a brush roller is mounted in close proximity to each toothed roller having reference numerals 121, 122, 123, 124 and 125 in similar fashion being in order from the front of the apparatus. Also in a similar fashion, an air knife is provided in close proximity to the nip between each toothed roller and its associated brush roller, the air knives having reference numerals 131, 132, 133, 134 and 135 ordinally from the front of the apparatus. The brush rollers and air knives have the same last digit as the corresponding beater rollers and toothed rollers.

It can be seen that the pathway for cotton plants received into the first form of cotton harvesting apparatus can pass between the gathering roller 101 and the lower roller of the first pair of toothed rollers 103, then between the first pair of toothed rollers 102 and 103, and from their rearward between the second pair of rollers 104 and 105.

Figure 2:
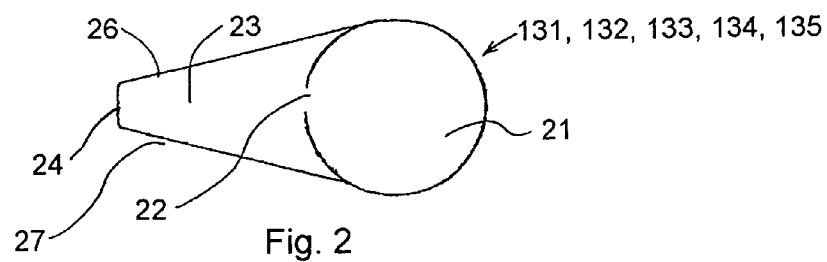
FIG. 2 is a diagrammatic side sectional view of an air knife for use in cotton harvesting apparatus in accordance with the invention.
Figure 3:
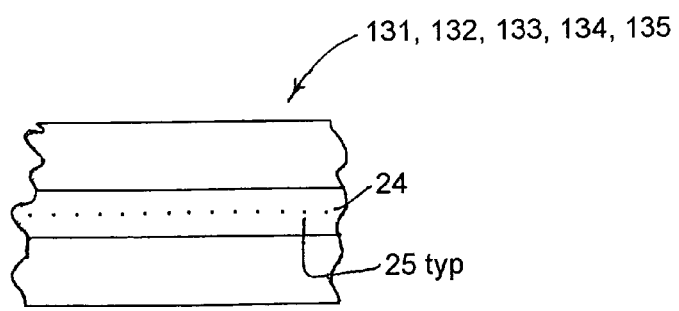
FIG. 3 is a front view of the air knife of FIG. 2.

Referring to the air knife detail in FIGS. 2 and 3, the air knife 131, 132, 133, 134 and 135 has a circular conduit portion 21 having one or more elongate apertures 22 extending therealong and facing into a plenum chamber 23 having converging side walls 26 and 27 which are joined at their distal edges remote from the delivery conduit at a front wall 24. The front wall has a plurality of apertures shown typically at 25 at regularly spaced intervals approximately halfway intermediate the two edges of the front wall extending a substantial proportion of the length of the air knife for directing a rapid velocity airstream laterally therefrom and directed at an appropriate angle to the nip between the brush roller and the toothed roller.

Figure 4:
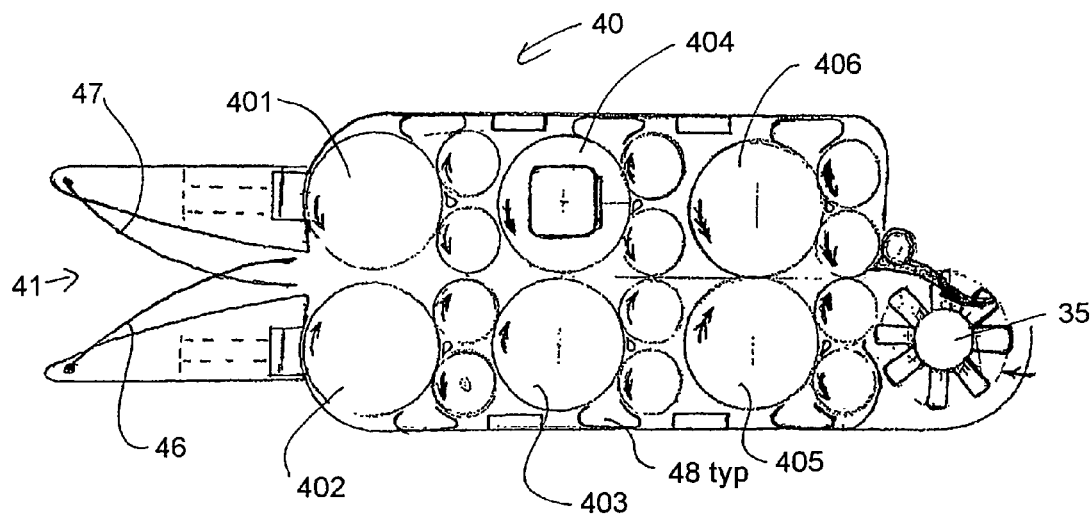
FIG. 4 is a diagrammatic plan sectional view of a second form of cotton harvesting apparatus according to the invention.
Figure 5:
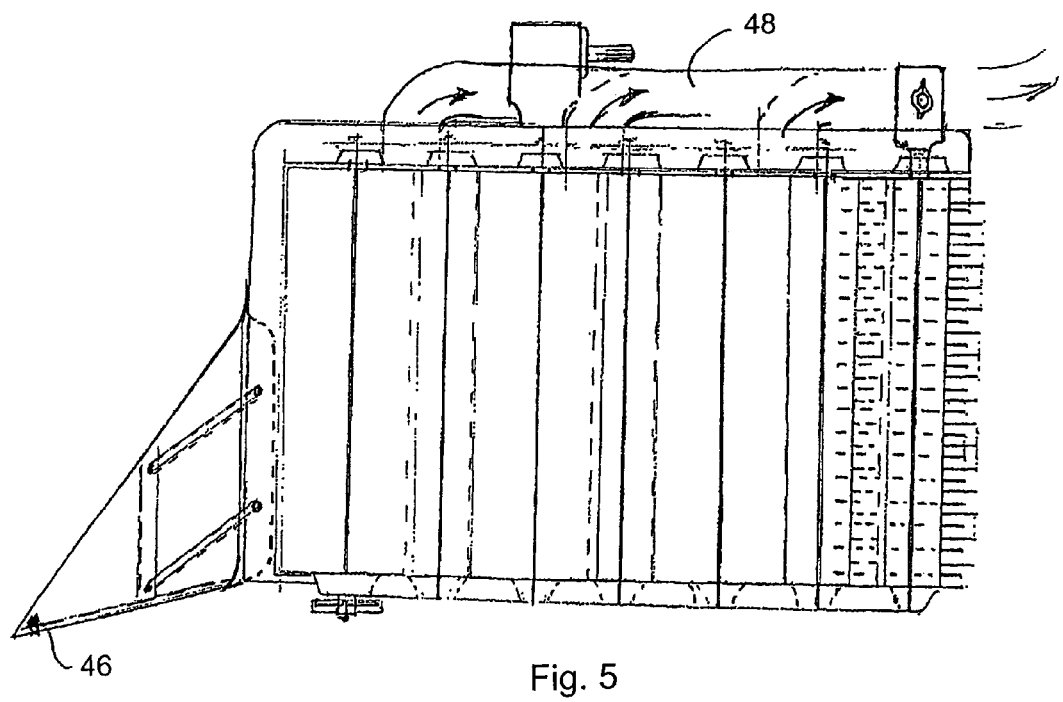
FIG. 5 is a diagrammatic side sectional view of the cotton harvesting apparatus of FIG. 4.

The second form of cotton harvesting apparatus 40 shown in FIGS. 4 and 5 has three pairs of toothed rollers numbered 401, 402, 403, 404, 405 and 406 from the front end 41 to the rear of the apparatus. The toothed rollers are arranged in substantially parallel spaced relationship to one anther. Two plant gathering wires 46 and 47 are arranged for guiding cotton plants into the nip between the first pair of toothed rollers 401 and 402. In similar fashion to the arrangement of the beater rollers, brush rollers and air knives shown in respect of the first form of cotton harvesting apparatus 10 shown in FIG. 1, the second form of cotton harvesting apparatus 40 shown in FIG. 4 has respective beater rollers, brush rollers and air knives with respective reference numerals for the beta rollers being 411 through to 416, the brush rollers being 421 through 426 and the air knives being 431 through 436, the last digit of each reference numeral corresponding to that of the associated toothed roller.

It can be seen that cotton plants drawn into the harvesting apparatus between the guide wires are lead between the first two toothed rollers 401 and 402, and thence between the nip between the second pair of toothed roller 403 and 404, and thence between the nip of the third pair of toothed rollers 405 and 406.

At or near the rear of each of the first and second form of cotton harvesting apparatus is provided a shredder 35 for shredding the cotton plant material from which cotton fibre has been substantially removed by the toothed rollers, beater rollers and brushes. In each form of cotton harvesting apparatus, air ducts are provided from the side of the nip between the brush rollers and the toothed rollers remote from the air knife, the ducting system for the first type of cotton harvesting apparatus having reference numeral 18 and in the case of the second form of the harvesting apparatus having reference numeral 48.

In use, apparatus of this invention is formed as a combine harvesting machine which operates by cutting the cotton off at the base, propelling the cut plant through a series of both mechanical and pneumatic apparatus which removes substantially all of the available seed cotton from the plant. The cotton is conveyed for collection and the residual plant is shredded and expelled onto the ground.

As the plant enters the apparatus, the seed cotton is caught by the saw teeth attached to the revolving cylinders of the toothed rollers. As the seed cotton is caught and the plant is entering the apparatus, the base of the plant comes into contact with a reciprocating knife which cuts the plant at the required height above the ground. The plant is accelerated through the apparatus by incrementally increased revolutions of the remaining saw cylinders. That is, each associated set of spiked or toothed roller, beater and brush has an incrementally faster circumferential speed compared to the previous set, the previous set being closer to the front of the apparatus. The cotton is prevented from wrapping around the saw cylinders by a beater cylinder which also assists in plant acceleration and compression to allow the saws to remove the seed cotton. The beater cylinder assists in maintaining a clean sample by adjustment of the gap set between it and the saw teeth. The beater rollers are preferably formed from plastics or rubber.

After the seed cotton becomes attached to the saw cylinder and rotates beyond the beater cylinder, it then comes into contact with a cylindrical brush which is rotating at a higher tip speed than the saw. At this location, air is directed at the saw to assist the brush to remove the cotton which is conveyed by ducted air to a basket for collection. The residual plant material is then passed through a high speed rotating shredder from which the shredded material is returned to the ground.

The apparatus of the present invention may be added to the front of a conventional picker instead of a conventional row crop picker head or a conventional stripper front with minimal, if any, modification of the picker. The shredder is normally hydraulicly driven, and would therefore usually require the addition of a hydraulic pump and motor.

Although the invention has been described with reference to one or more specific examples, it will be appreciated by persons skilled in the art that the invention may be embodied in other forms within the broad scope and ambit of the invention as claimed by the following claims.

The invention claimed is:

1. Cotton harvesting apparatus arranged for forward motion through a cotton crop comprising cotton plants having cotton boils, said cotton harvesting apparatus including:
   a mounting assembly having a plurality of mounting locations arranged in spaced relationship to one another;
   one or more gathering rollers mounted to said mounting assembly for rotation about a guide roll axis or axes at one or more of said mounting locations for gathering one or more of the cotton plants into a processing disposition between said gathering roller mounting locations;
   a cutter assembly mounted to and extending laterally between respective ones of said mounting locations for cutting stems from the one or more cotton plants to produce cut cotton plant material, the relative disposition of said cutter assembly being behind said gathering roller or rollers at a spacing selected to permit cut cotton plant material gathered into the processing disposition to be cut from the remainder of the cotton plants;
   a pair of toothed rollers mounted to and extending between respective ones of said mounting locations, each said toothed roller being disposed in spaced parallel relationship to the other for contra rotation about substantially parallel toothed roller axes to provide a pinch therebetween, the spacing between the toothed rollers being selectable to permit passage of the cut cotton plant material through said pinch, said toothed rollers having a plurality of barbs arranged for removing at least some of the cotton fibre from the cotton bolls of the cut cotton plant material;
   one or more beater rollers mounted to and extending between respective ones of said mounting locations for co-rotation with, and in operative disposition with respect to, each toothed roller, the relative locations of the beater roller or rollers being selectable to permit further passage of the cut cotton plant material through said pinch between said toothed rollers;
   one or more cotton fibre removal rollers mounted to and extending between respective ones of said mounting locations and operatively associated with said toothed rollers for removing the cotton fibre from the toothed rollers; a drive transmission operatively interconnecting the rotatable and/or moving parts for rotation or movement in their respective relative directions; and
   a drive operatively associated with the drive transmission for driving the drive transmission and thereby the rotatable parts about their respective axes or for moving the moveable parts.

2. Cotton harvesting apparatus according to claim 1, further including guiding wires being arranged in opposed disposition with respect to one another, said guiding wires being resiliently biased towards a relaxed position in which said wires cross in substantially central alignment with said pinch between said toothed rollers.

3. Cotton harvesting apparatus according to claim 1, wherein said gathering rollers, said toothed rollers and said removal rollers are mounted laterally.

4. Cotton harvesting apparatus according to claim 1, wherein said gathering rollers, said toothed rollers and said rollers are mounted uprightly.

5. Cotton harvesting apparatus according to claim 2, wherein said guiding wires are arranged to engage with the lower part and/or lower branches of a cotton plant to urge the upper portion of the plant to be guided between said toothed rollers.

6. Cotton harvesting apparatus according to claim 1, wherein said removal rollers include a plurality of brush bristles having distal ends such that the operative disposition of the distal ends of said bristles with respect to the toothed rollers is selectable for substantial removal of the cotton fibre from said toothed rollers.

7. Cotton harvesting apparatus according to claim 6, and including an air knife operatively associated with one or each said removal rollers and being operable to assist in the substantial removal of the cotton fibre from said toothed rollers.

8. Cotton harvesting apparatus according to claim 3, wherein said toothed rollers, beater rollers, and removal rollers constitute a first set of rollers, and there is further provided a second set of toothed rollers, beater rollers and removal rollers in operative disposition behind the first set to receive the plant material for further removal of cotton fibre therefrom.

9. Cotton harvesting apparatus according to claim 1, wherein said drive transmission is arranged such that, in operation, the circumferential speed of the rotatable elements increases along the pathway through which the cotton plant material is intended to pass.

10. A method of harvesting cotton including:
   gathering an upper portion of one or more cotton plants into cotton harvesting apparatus;
   cutting the upper portion or portions from the cotton plant or plants from the remainder of the cotton plant or plants to provide cut cotton plant material;
   substantially removing cotton fibre from the cut cotton plant material to provide cotton plant discard;
   discharging the cotton fibre from the cotton harvesting apparatus;
   discharging the cotton plant discard from the cotton harvesting apparatus;
   wherein the cotton harvesting apparatus includes:

a mounting assembly having a plurality of mounting locations arranged in spaced relationship to one another;

one or more gathering rollers mounted to said mounting assembly for rotation about a guide roll axis or axes at one or more of said mounting locations, for gathering one or more of the cotton plants into a processing disposition between said gathering roller mounting locations;

a cutter assembly mounted to and extending laterally between respective ones of said mounting locations for cutting stems from the one or more cotton plants to produce cut cotton plant material, the relative disposition of said cutter assembly being behind said gathering roller or rollers at a spacing selected to permit cut cotton plant material gathered into the processing disposition to be cut from the remainder of the cotton plants;

a pair of toothed rollers mounted to and extending between respective ones of said mounting locations, each said toothed roller being disposed in spaced parallel relationship to the other for contra rotation about substantially parallel toothed roller axes to provide a pinch therebetween, the spacing between the toothed rollers being selectable to permit passage of the cut cotton plant material through said pinch, said toothed rollers having a plurality of barbs arranged for removing at least some of the cotton fibre from the cotton bolls of the cut cotton plant material;

one or more beater rollers mounted to and extending between respective ones of said mounting locations for co-rotation with, and in operative disposition with respect to, each toothed roller, the relative locations of the beater roller or rollers being selectable to permit further passage of the cut cotton plant material through said pinch between said toothed rollers;

one or more cotton fibre removal rollers mounted to and extending between respective ones of said mounting locations and operatively associated with said toothed rollers for removing the cotton fibre from the toothed rollers; a drive transmission operatively interconnecting the rotatable and/or moving parts for rotation or movement in their respective relative directions; and a drive operatively associated with the drive transmission for driving the drive transmission and thereby the rotatable Parts about their respective axes or for moving the moveable parts.

11. A method according to claim 10, including:

moving the apparatus in operative juxtaposition with respect to a plurality of cotton plants whilst rotating the rollers therein;

gathering an upper portion or portions of one or more of the cotton plants into a processing disposition by the gathering roller;

cutting the upper portion or portions from the remainder of the cotton plant by the elongate cutters to provide cut cotton plant material;

removing at least some of the cotton fibre from the cut cotton plant material by passing the cut cotton plant material between a pair of toothed rollers;

removing at least some more of the cotton fibre from the cut cotton plant material by passing the cut cotton plant material through upper and lower beater rollers mounted co rotating with, and in operative disposition with respect to, the toothed rollers respectively; and removing the cotton fibre from the toothed rollers using cotton fibre removing rollers rotating in operative spaced relationship with respect to the toothed rollers.

* * * * *